Sept. 28, 1965 W. L. McDONALD 3,209,132

SERIAL BINARY ADDER-SUBTRACTER

Filed Aug. 28, 1962 4 Sheets-Sheet 1

INVENTOR.
WILLIAM L. MC DONALD

BY Karl A. Ohralik

ATTORNEY.

Sept. 28, 1965 W. L. McDONALD 3,209,132

SERIAL BINARY ADDER-SUBTRACTER

Filed Aug. 28, 1962 4 Sheets-Sheet 4

United States Patent Office 3,209,132
Patented Sept. 28, 1965

3,209,132
SERIAL BINARY ADDER-SUBTRACTER

William L. McDonald, Lexington, Ky., assignor to International Business Machines Corporation, New York, N.Y., a corporation of New York Filed Aug. 28, 1962, Ser. No. 219,860
8 Claims. (Cl. 235—175)

Figure 1:
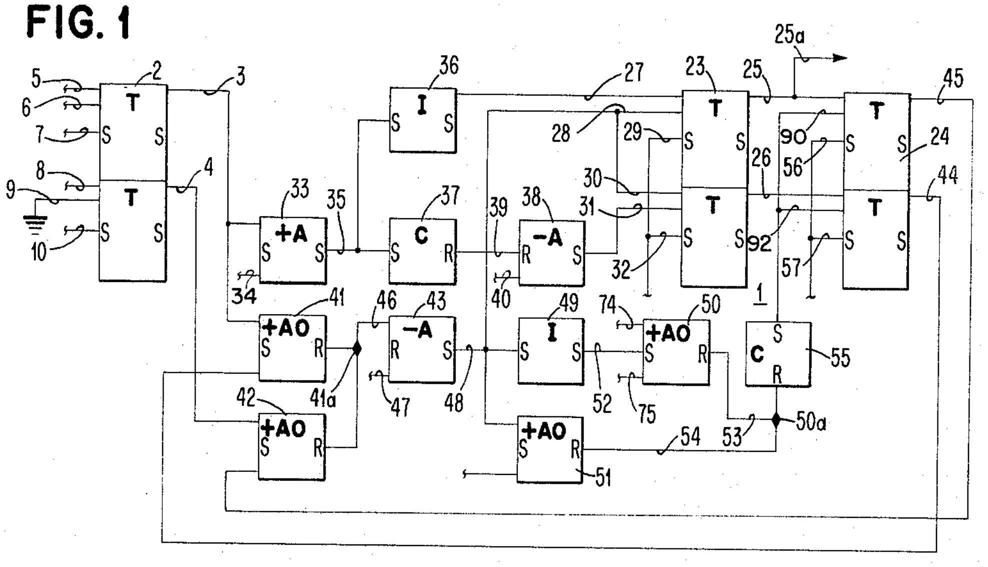

This invention relates to an arithmetic unit capable of selectively, directly adding or subtracting binary numbers.

Binary digit "1" in any order of a binary number may be represented by an electrical pulse and a binary "0" in any order of such a number may be represented by the absence of such a pulse. Thus, an entire multi-digit, binary number may be represented by a temporal series of electrical pulses, one appearing in each binary interval corresponding to a binary order of the binary number in which binary number "1" appears. Typically, the pulses correspond to the binary digits lowest order first and progressively higher orders in sequence.

Serial binary addition may be performed by the repeated addition of digits of the respective numbers of like binary order, digit by digit, proceeding from the lowest ordered digit in sequence to the highest ordered digit and in each case taking into consideration the digit to be carried from the next proceeding lower order addition. Electronic logic circuits have been devised which are effective in carrying out the step by step addition in a manner hereinabove described. Serial binary subtraction may similarly be performed by the step by step subtraction of a digit in a subtrahend number from the corresponding ordered digit of a minuend number, due consideration in each case being given to the digit borrowed by the next preceding lower ordered subtraction. In implementing circuitry for performing serial binary subtraction, however, it is customary to add an arithmetic complement of the subtrahend number to the minuend number in the manner hereinabove described with respect to the addition of binary numbers. In the case of such an addition of a complemented subtrahend number due consideration must be given to an "end-carry" developed in the order next higher to the highest order of the binary numbers subtracted. In the case of such subtraction by complementary addition, circuitry is required for developing the complemented number and this circuitry is usually relative complex in relation to the circuitry involved for performing the addition.

augend or minuend of a predetermined order, the second column represents the addend or subtrahend of the same order, the third column represents a carry or borrow digit resulting from an operation in the next lower order from the predetermined order and the fourth column represents a sum or difference digit as the case may be. The fifth column of this truth table represents the carry digits to a higher order resulting from an addition of the augend, addend and carry digits represented and the sixth column represents the borrow from the next higher order resulting from a subtraction of the stated subtrahend from the minuend taking into account the borrow digit from the next lower order. While the sum and difference numbers resulting from addition or subtraction are identical when augend, addend and carry from next lower order correspond to minuend, subtrahend and borrow by next lower order, respectively it is observed that in this case, the carry to next higher order and borrow from next higher order are not necessarily the same.

In the adder/subtracter of this invention, the digits of any two numbers are handled serially but alternately, low order first. Thus, the addend or subtrahend digit of any predetermined order is handled first and then the augend or minuend digit of this predetermined order is handled next. The respective times of handling these digits are called $x$ time and $y$ time, and the sum of an $x$ time and a $y$ time is equal to a digit time. The pulses representative of the digits of the respective numbers are applied to a storage trigger which has two states of equilibrium, referred to as "on" and "off" states to indicate the digits "1" and "0," respectively. In accordance with the invention, two other binary triggers are employed, called the accumulator and carry/borrow triggers. At the end of any digit time the accumulator trigger is indicative of the sum or difference between numbers at the completion of an addition or subtraction and the carry/borrow trigger serves the purposes of indicating the carry or borrow digits involved both from lower orders and to higher orders. That is, at the beginning of a digit time, the carry/borrow trigger indicates either the digit to be carried over to the present order or borrowed from the present order, as the case may be, and at the end of a digit time, this trigger indicates the digit to be carried over to the next higher order or to be borrowed from the next higher order, also as the case may be.

From a review of the accompanying truth table, it is

*Table I*

| Y | X | Carry or Borrow | Sum or Diff. | Carry to higher order | Borrow from higher | St. Tr. ≠ Carry @ Y-time | For Add, *set* carry to Acc. @ Y-time | For Subt. set carry to Acc. @ Y |
|---|---|---|---|---|---|---|---|---|
| 0 | 0 | 0 | 0 | 0 | 0 | No | No | Yes. |
| 1 | 0 | 0 | 1 | 0 | 0 | Yes | Yes | No. |
| 0 | 1 | 0 | 1 | 0 | 1 | No | No | Yes. |
| 1 | 1 | 0 | 0 | 1 | 0 | Yes | Yes | No. |
| 0 | 0 | 1 | 1 | 0 | 1 | Yes | Yes | No. |
| 1 | 0 | 1 | 0 | 1 | 0 | No | No | Yes. |
| 0 | 1 | 1 | 0 | 1 | 1 | Yes | Yes | No. |
| 1 | 1 | 1 | 1 | 1 | 1 | No | No | Yes. |

It has been observed in binary addition and subtraction that if three binary digits represent respectively the augend and addend of a predetermined order and the carry digit from the next lower order, the sum digit resulting from such an addition is the same as a difference digit resulting from a substraction wherein the minuend and the subtrahend of a certain order correspond to the above mentioned augend and addend and the digit borrowed by the next lower order corresponds to the above mentioned carry digit. This is represented in the accompanying truth table wherein the first column represents the observed that given an addend digit in a predetermined order, the sum digit for that order resulting from the addition of the augend digit and carry digit from the next lower order, is different from the addend digit only if the augend and carry digits are unlike. Furthermore, it may be observed that in cases wherein such augend and carry digits are unlike, the carry digit to the next higher order is different from the sum digit and that otherwise it is the same as the carry digit from the next lower order.

It is still further observed that for subtraction, the difference digit is other than the subtrahend digit only if the minuend and digit borrowed by the next lower order are unlike. The borrow digit from the next higher order is the same as the difference digit only if the minuend digit and borrow by the next lower order are alike and otherwise the borrow digit from the next higher order is the same as the borrow digit by the next lower order.

From the foregoing observations, rules may be established for addition and subtraction, as follows:

| | ADD | SUBTRACT |
|---|---|---|
| $x$ time | Set accumulator to storage trigger. | Set accumulator to storage trigger. |
| $y$ time | If carry trigger ≠ storage trigger, change state of accumulator and set carry trigger to previous accumulator state. | If carry trigger ≠ storage trigger, change accumulator. If accumulator does not change set carry trigger to state of accumulator. |

For performing the steps set forth by these rules, provision is made for setting the accumulator trigger to the state of the storage trigger at $x$ time and an exclusive OR circuit having as inputs the respective outputs of both storage trigger and carry/borrow trigger, is provided which has an output which is applied to both "on" and "off" gates of the accumulator trigger to change the state of the accumulator in response to the exclusive condition. The carry/borrow trigger has two legged AND input "on" and "off" gates, one leg of each being connected to respective "on" and "off" outputs of the accomulator trigger and the carry/borrow trigger is set to the state of the accumulator trigger at $y$ time in accordance with the summary of the immediately preceding paragraph by appropriate logical circuitry.

The foregoing and other objects, features and advantages of the invention will be apparent from the following more particular description of a preferred embodiment of the invention, as illustrated in the accompanying drawings.

Figure 2:
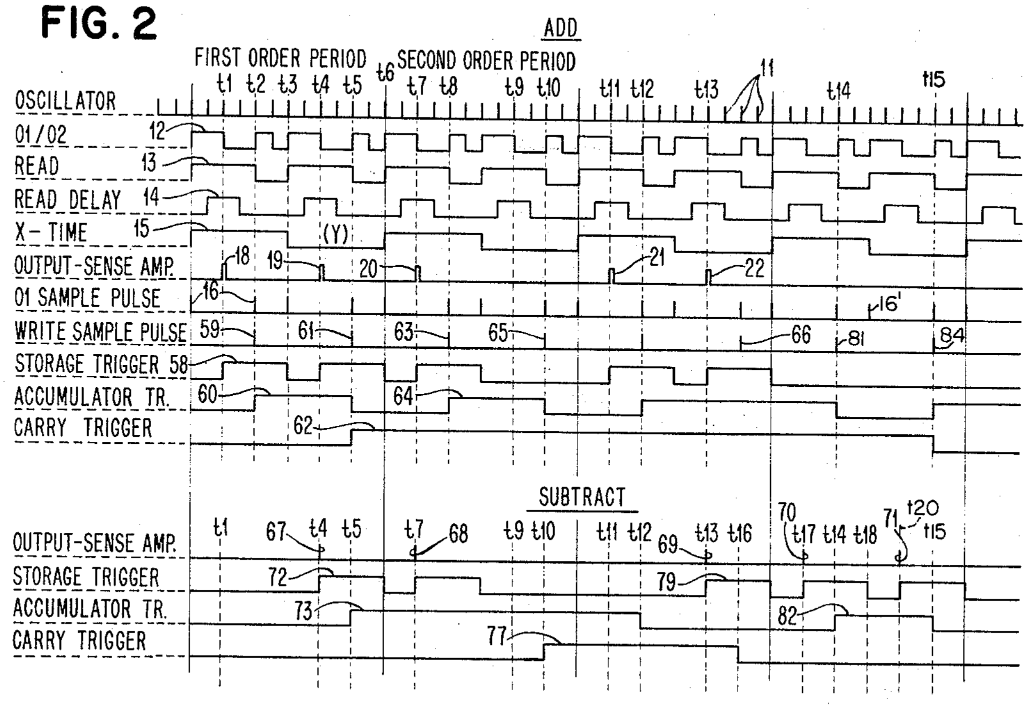

In the drawings:

FIGURE 1 is a block diagram showing the components and interrelationship thereof in accordance with the adder/subtracter circuit of this invention, FIGURE 2 is a graph showing the timing potentials and representative potentials derived at certain nodes of the circuit of FIGURE 1 in performing typical addition and subtraction operations.

Figure 3:
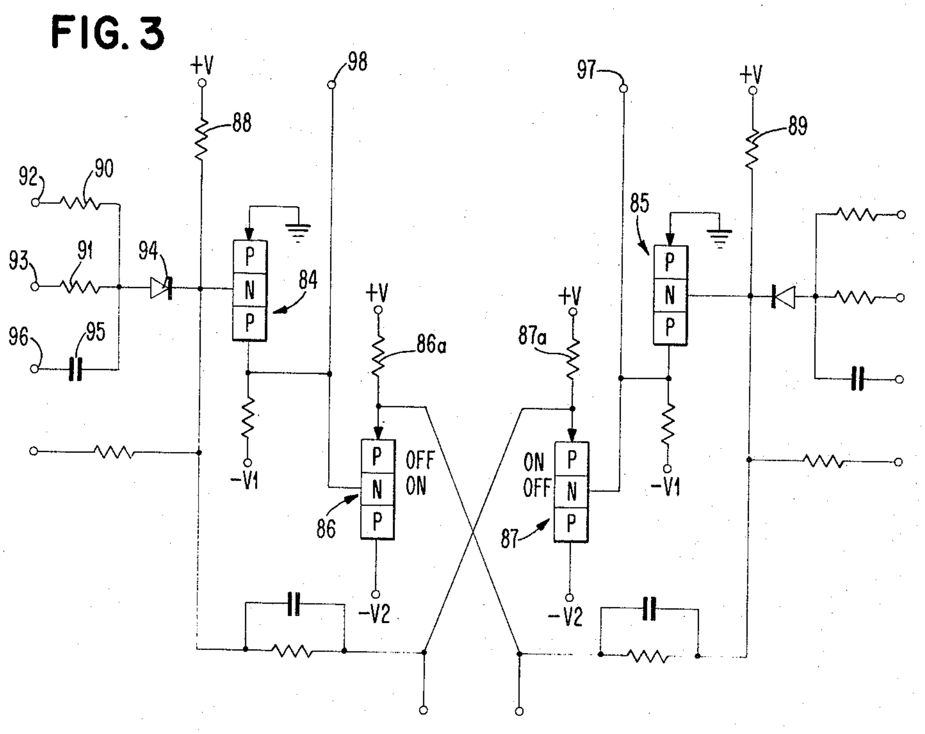
Figure 4:
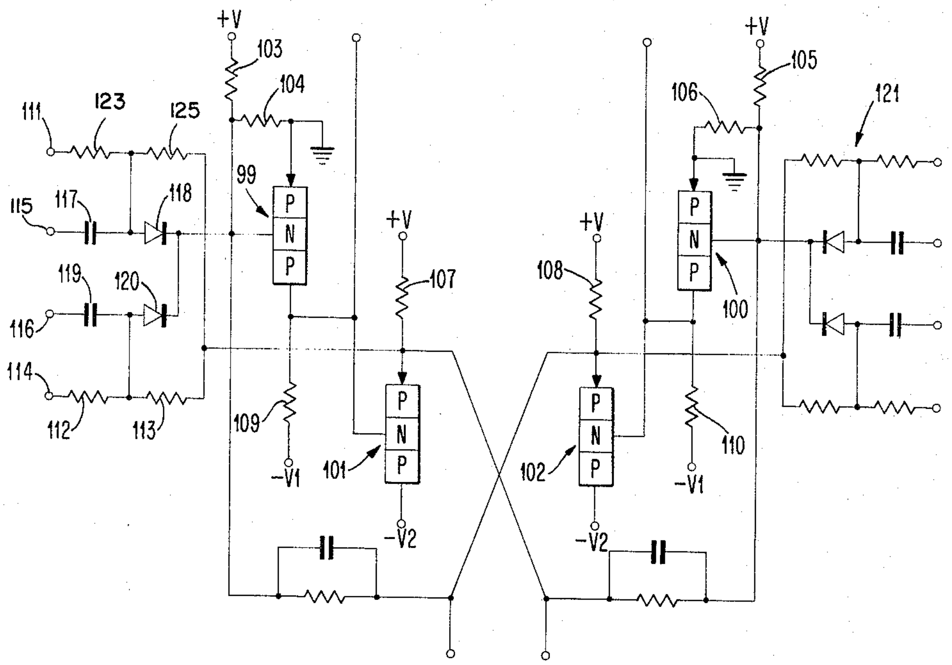
Figure 5:
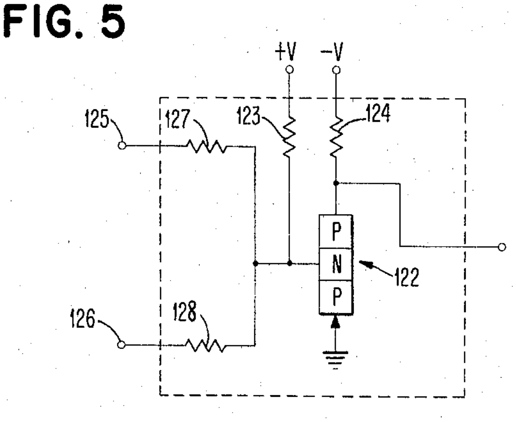
Figure 6:
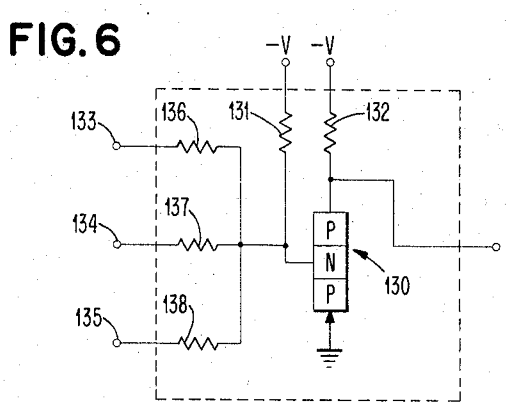
Figure 7:
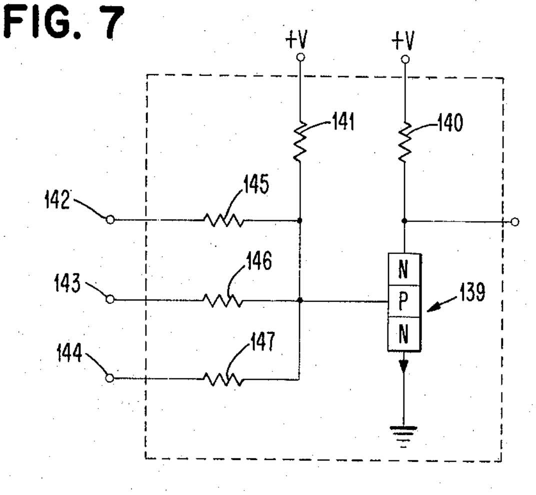
Figure 8:
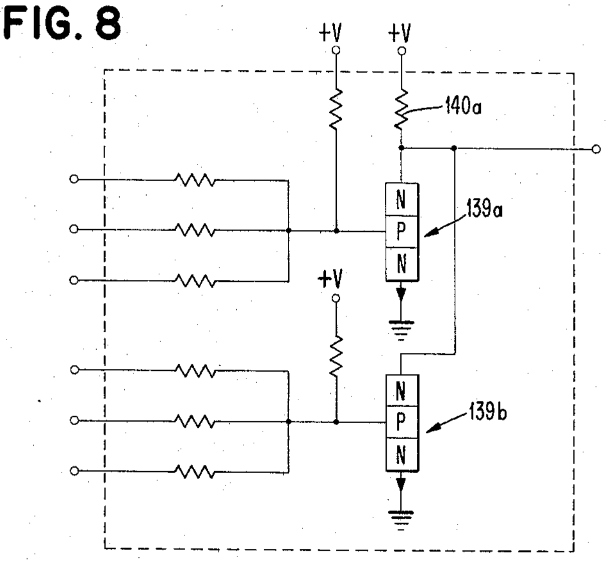

FIGURE 3 is a schematic diagram of one type of bistable trigger circuit having AND type "on" and "off" gates and being usable in the circuit of FIGURE 1, FIGURE 4 is a schematic diagram of another type of bistable trigger circuit having OR type "on" and "off" gates and being usable in the circuit of FIGURE 1, FIGURE 5 is a schematic diagram of a positive AND circuit and which, with one input, may be regarded as an inverter, both being usable in the circuit of FIGURE 1, and FIGURE 6 is a schematic diagram of a negative AND circuit usable in the circuit of FIGURE 1, FIGURE 7 is a schematic diagram of another positive AND circuit usable in the circuit of FIGURE 1, FIGURE 8 is a schematic diagram of an exclusive OR circuit usable in the circuit of FIGURE 1.

In FIGURE 1 of the drawings, 1 represents generally the combination adder and subtracter of this invention. Electrical potentials indicative of digits of binary numbers involved in an addition or subtraction are developed by a storage trigger 2 of a type shown in detail in FIGURE 3 of the drawings. This trigger has two output lines, 3 and 4, and is capable of assuming two different states of stable equilibrium in each of which, the output potentials are different and further are mutual inversions in the sense that binary of logical "1" is the inverse of binary of logical "0." Also, in the condition of equilibrium wherein line 3 is a ground potential or logical "1" the trigger 2 is regarded as being "on" and in its other condition of equilibrium, it is regarded as being "off."

In the present application, ground potential represents binary or logical "1" and potentials other than ground, either plus or minus, represent binary or logical "0". Input and output lines may range from some negative value to ground designated the "S" range and from ground to some positive value designated the "R" range. Inputs and outputs of trigger 2 are in the S range.

For turning "on" the trigger 2, and AND gate of the trigger must be conditioned by logical "1" potentials applied at input lines 5 and 6 at a time when an impulse is applied to input line 7. Similarly, for turning the trigger "off," an AND "off" gate of the trigger must be conditioned by logical "1" potentials at input lines 8 and 9 at a time when an electrical impulse is applied to input line 10. For addition and substraction, line 5 is conditioned at all times by a suitable control and line 9 is connected to ground for continuous conditioning.

For an understanding of the manner in which the gates of storage trigger 2 are conditioned, reference is made to FIGURE 2 of the drawings. In this figure, basic timing pulses are represented at 11 and the period between these pulses is a basic timing period. These pulses may be derived in any suitable manner as for example, by shaping and differentiating a sine wave oscillator output wave. An order period during which a digit of each number in an addition or subtraction is handled comprises twelve basic timing periods. A rectangular wave 12, otherwise called an "01" wave and derivable from pulses 11 as by a suitable trigger circuit similar to trigger 2 is cyclical and has a long subcycle for the duration of four basic timing periods and a short subcycle for the duration only two basic timing periods. Another rectangular wave shown at 13 is provided and is called the "read" wave. This wave is cyclical and has a period of six basic timing periods. However, it is nonsymmetrical in that the periods of "read" potential are twice as great as the periods of its absence. A "write" wave, not shown, which is the exact complement of wave 13 is also developed and applied to line 8 of the "off" gate of storage trigger 2.

A wave called the "read delay" wave is shown at 14 and is the essentially the complement of the "read" wave and delayed a half period with respect to the "read" wave. This "read delay" potential is applied to line 6 of the "on" gate of storage trigger 2. An $x$-time gate pulse extant for the first 6 basic timing periods of each order period is shown at 15 and a $y$-time gate pulse which may be represented by a wave which is the exact complement of wave 15 is developed during the last 6 basic timing periods of each order period.

A "01" sample pulse as shown at 16 is derived at each leading edge of wave 12. These pulses are applied to line 10 input to storage trigger 2. Pulses representative of binary digits in the two numbers involved are applied to line 7 of the trigger 2. This line typically may be from the output of a sense amplifier which receives information from a memory device. Typical pulses produced on line 7 are shown at 18, 19, 20, 21, and 22.

Accordingly, as information is supplied along line 7, at times that the "on" gate of trigger 2 is conditioned, the trigger 2 is turned on; and at the concurrence of the "write" pulse, the complement of wave 13, as discussed above, and "01" sample pulse, the trigger 2 is turned off.

The adder circuit 1 further includes an accumulator trigger 23 which may be of a type shown in detail in FIGURE 4 of the drawings and having S level inputs and outputs. The accumulator trigger 23 is capable of assuming two different states of stable equilibrium and in each state the potentials at its output lines are different and in each case are mutual inversions with respect to each other. The accumulator trigger is regarded as being "on" in the condition wherein line 25 is at substantially ground potential indicative of binary "1." For turning this trigger "on," either one of its "on" gates 27 or 28 must be conditioned at the time that a sample pulse is applied to line 29. Similarly, for turning off the accumulator trigger 23 either of its "off" OR gate legs at lines 30 and 31 must be conditioned. The conditioning of either of these two gates simultaneous with the application of a sample pulse at line 32 is effective to turn "off" the trigger. Thus, it is seen that the accumulator trigger 23 is similar to the storage trigger, with the exception, that its "on" and "off" gates are OR gates rather than AND gates.

The "on" or "off" condition of the accumulator trigger is indicative of the sum or difference in any order of an addition or subtraction of two binary digits. The "on" condition of the accumulator trigger at the end of any order period is indicative of a sum of "1" in the case of addition and a difference of "1" in the case of subtraction. Conversely, its "off' condition in either case is indicative of a zero sum or difference, as the case may be.

Output line 25 of accumulator trigger 23 is directly connected to one leg of an "on" AND gate of a carry/borrow trigger 24 and output line 26 of the accumulator trigger is connected to one leg of the "off" AND gate of the carry/borrow trigger. The carry/borrow trigger 24 is shown in detail in FIGURE 3 of the drawings and thus, is structurally the same as storage trigger 2.

For setting the accumulator trigger to the state of the storage trigger during each "*x*" time, the output line 3 of the storage trigger 2 is combined with an "*x*" time pulse, as shown at 15 in FIGURE 2, and applied to one leg of the "on" gate and one leg of the "off" gate of the accumulator trigger. Thus, line 3 provides one input of a positive AND circuit 33 the other input 34 of which receives "*x*" time pulses. The positive AND circuit 33 has a S input and output levels and may be of a type as shown in detail in FIGURE 5 of the drawings. An output line 35 of circuit 33 is connected to the input of a positive AND circuit 36 which may be of a construction similar to positive AND circuit 33 but wherein only one input line is used. The circuit 36 serves as an inverter and its output is directly connected to line 27 as one input to the "on" OR gate of the accumulator trigger 23. The output line 35 of circuit 33 is also connected to a converter circuit 37 having S input level and R output level and which is used merely for purposes of proper potential matching. This circuit may be of a construction of the positive AND circuit shown in FIGURE 7 of the drawings but wherein only one input line is used. The output 39 of the converter 37 is applied as one input to the negative AND circuit 38 having R input level and S output level, the other input 40 of this circuit receiving "*x*" time pulses. The output line of this AND circuit is connected to input line 31 of the "off" OR gate of the accumulator trigger. In Boolean expressions, the input line 27 has applied to it (*x*-time pulse 15·storage trigger pulse) and the line 31 has applied to it (*x*-time pulse 15·not storage trigger pulse)

Thus, it is seen that at "*x*" time, the "on" condition of the storage trigger is effective to turn on the accumulator trigger and the "off" condition of the storage trigger is effective to turn off the accumulator trigger.

The condition of the accumulator trigger is further affected by an exclusive OR circuit including the two AND circuits 41 and 42 which may be of a construction essentially as shown in detail in FIGURE 7 of the drawings. These two circuits, however, may have a common output and share a common load resistor as shown in detail in FIGURE 8 of the drawings. Thus, the outputs of the circuits perform an exclusive OR function and such construction is herein termed a "dot OR" and is represented by the diamond shaped junction **41*a*. AND circuit 41 has a pair of inputs, one of which is connected to the output 3 of the storage trigger, and the other of which is connected to an output line 44 of the carry/borrow trigger 24. The line 44 is at ground potential indicative of binary "1" when the carry/borrow trigger is "off." AND circuit 42 has one of its two inputs connected to the output line 4 of the storage trigger and the other of its two inputs connected to the output 45 of the carry/borrow trigger 24. This output line is at ground potential indicative of binary "1" when the carry/borrow trigger is "on." The circuits 41 and 42 perform an exclusive OR function and the outputs of these AND circuits 41 and 42 are connected as shown in FIGURE 8 to form one input 46 to an AND circuit 43. The other input 47** to the circuit receives "*y*" time pulses. The output 48 of AND circuit 43 which is herein termed the "accumulator *y* gate" is connected by lines 28 and 30 respectively to both the "on" and the "off" OR gates of the accumulator trigger 23. Accordingly, it is seen that at *y* time, the state of equilibrium of the accumulator trigger is changed if and only if either one of two conditions exists as follows: (1) the storage trigger is "on" and the carry trigger is "off," or (2) the storage trigger is "off" and the carry trigger is "on."

For controlling the condition of the carry/borrow trigger, an inverter circuit 49 and a pair of AND circuits 50 and 51 are provided. The inverter 49 may be of the construction of the positive AND circuity shown in FIGURE 5 of the drawings wherein only one input is used. The AND circuits 50 and 51 have outputs connected together as represented by symbol **50*a* and may be of a construction of the circuit shown in FIGURE 8 of the drawings wherein three and two inputs, respectively, are used. The lone input to inverter circuit 49 is supplied by the line 48 serving as the output of AND circuit 43. The output line 52 of the inverter 49 serves as one of the three inputs to AND circuit 50** and the other two inputs to this circuit are provided by the "*y*" time gate and a potential indicative of a subtract specification of the circuit. Absence of the subtraction specification, of course, results in no effective output at the output of the AND circuit 50 since the AND condition at the input can not be met. AND circuit 51 has its two inputs connected respectively to line 48 and to a source indicative of an add specification of the circuit. Absence of the add specification, of course, results in no effective output at the output of the AND circuit 51 since the AND condition at the input can not be met. The outputs 53 and 54 of each of the AND circuits 50 and 51 are connected to the input of an S to R level converter 55 having its output connected to one of each of the "on" and "off" gates of the carry/borrow trigger. Since the output of AND circuits 50 and 51 are connected together at **50*a* it can be useful to think of them as dot ORed because the point 50*a* goes to ground when either of the outputs of AND circuits 50 and 51 goes to ground and because, since the system is never in the subtract specification and add specification simultaneously, the outputs never go to ground simultaneously. It is seen, therefore, that since the respective outputs 25 and 26 of the accumulator trigger are connected to the respective AND gate inputs of the carry/borrow trigger under an "add" specification of the circuit 1** and at "*y*" time, the condition of the carry-borrow trigger is changed if a conditioning pulse is applied from line 48 to AND circuit 51. Under these very same conditions, the state of equilibrium of the accumulator trigger is changed whereby after this "*y*" time interval, the accumulator has changed state and the carry/borrow trigger has assumed the previous state of the accumulator trigger.

It should be noted at this point that no "race" problem exists at the input to the carry/borrow trigger whereby the signal to the lines 90 and 92 of this trigger must arrive before the change of state of the accumulator trigger. This is because the "falling" gate of either line 25 or line 26 is effective to provide a conditioning pulse to the appropriate carry/borrow trigger input line. Thus, even though the accumulator trigger is changing state, it provides the effective conditioning pulse to the carry/borrow trigger.

Since the condition of the accumulator trigger indicates the sum or difference in the cases of addition and subtraction of digits, the line 25 serves as an output of the adder for "writing" back into memory or for other purposes as desired and an output line 25*a* is shown for these purposes.

For a better understanding of the manner in which the present circuit serves to add a pair of binary numbers, reference is again made to FIGURE 2 of the drawings. Assuming that the binary numbers 101 and 111 are augend and addend, respectively, in an addition, the pulses 19 and 22 represent the binary "1" digits of the augend while the binary "0" digit of this number is represented by the absence of a pulse at "*y*" time of the second order period. The pulses 18, 20 and 21 represent, respectively, the binary "1" digits of the addend. The augend digits appear at "*y*" time and the addend digits appear at "*x*" time.

At the appearance of pulse 18, line 5 of the storage trigger is pre-conditioned to specify "add" and "read delay" 14 after an interval as shown in FIGURE 2 is also so as to condition line 6 of the storage trigger whereby the storage trigger is turned on at time *t*1, at the occurrence of pulse 18. This is represented at 58 in FIGURE 2 of the drawings. With the storage trigger "on" the "on" gate of the accumulator trigger is conditioned through circuit 33 and inverter circuit 36. At "*x*" time and at the occurrence of the "write" sample pulse 59 applied at line 29 at time *t*2, the accumulator trigger changes state as represented by the potential at 60. At the occurrence of an "01" sample pulse on line 10 during "write" time *t*3, the storage trigger "off" gate is conditioned and the storage trigger turns "off." It should again be noted that the "falling" write time pulse on line 8 is considered "up" and provides an effective conditioning potential. The accumulator trigger remains "on" to represent the binary "1" in the lowest order of the addend. Thereafter, during Y time of the first order period, the pulse 19 at time *t*4 representing the lowest order digit of the augend appears and being applied at line 7, it turns the storage trigger "on" again, the other required conditions for this existing. The accumulator trigger at this point is unaffected, but at the occurrence of the next "write" sample pulse 61 at time *t*5, the accumulator trigger is turned "off" to indicate that the addition of binary "1" to binary "1" yields a sum digit of "0," and the carry/borrow trigger is turned "on" to indicate that such an addition results in a carry digit of "1." The accumulator trigger is turned "off" at time *t*5 which is the concurrence of a "write" sample pulse on lines 29 and 32 and an "accumulator Y gate" pulse produced by the "off" condition of the carry/borrow trigger and the "on" condition of the storage trigger applied as inputs to the "exclusive OR" circuit of AND circuits 41 and 42 described. The carry/borrow trigger is turned "on" at time *t*5 on the concurrence of the "accumulator *y* gate" pulse and "ADD" potential applied to AND circuit 51 to condition through converter circuit 55 the one leg of the carry/borrow trigger "on" AND gate at 90. The "falling" gate on the output line 25 of the accumulator and the "write" sample pulse provide the other necessary conditions. The "on" condition of the carry/borrow trigger is indicated in FIGURE 2 of the drawings at 62. At time *t*6, a concurrence of "write" time pulse on line 8 and "01" sample pulse on line 10 turns the storage trigger "off." At this point the addition of the lowest order digits of the two numbers is completed.

The addition is continued with the appearance of pulse 20 indicative of the binary "1" digit in the second lowest order of the addend. The appearance of this pulse turns on the storage trigger at time *t*7, as previously explained, whereby the accumulator is turned at the occurrence of the "write" sample pulse 63 at time *t*8. The "on" condition of the accumulator at this stage is indicated by the potential pulse 64. Since the seocnd lowest order digit of the augend is "0," no pulse occurs during the second digit period at *y* time *t*9. The storage trigger is turned "off" at each cycle, as discussed above, and remains off because of the absence of a pulse at time *t*9. The accumulator trigger, however, is turned "off" at "write" sample pulse 65 at time *t*10 since the "accumulator *y* gate" is derived through the mentioned exclusive OR circuit made up of AND circuits 41 and 42 conditioned by the "on" condition of the carry/borrow trigger and the "off" condition of the storage trigger. The carry/borrow trigger remains "on", however, since only its "on" gate is conditioned by line 25. At this point, the addition of the second lowest order of digits is completed. The "off" condition of the accumulator trigger is indicative of the zero sum digit resulting from the addition and the "on" condition of the carry/borrow trigger is indicative of the carry digit to be carried to the next higher order of addition.

During the third order period, pulse 21 appears at time *t*11 to represent the binary "1" of the addend. This turns on the storage trigger and then the accumulator trigger at time *t*12 in the manner already explained. The pulse 22 appearing at Y time *t*13 of the third order to represent the binary number "1" of the augend, turns on the storage trigger. At this point of time, however, no "accumulator *y* gate" is developed since both the storage trigger and the carry trigger are "on" and the required exclusive-OR condition does not exist. Thus, the accumulator is not changed in its state. Also, the carry trigger fails to change state since its AND gates fail to receive the required pulse from AND circuit 51, which is dependent on the "accumulator *y* gate." Again, the "on" condition of the accumulator trigger indicates a sum digit of one and the "on" condition of the carry/borrow trigger indiactes a carry digit of one.

At "*x*" time of the fourth order period, the storage trigger remains "off" because there are no pulses received on input line 7 and at the occurrence of the "write" sample pulse the accumulator is turned off through AND circuit 33, converter 37 and AND circuit 38. At "*y*" time, the storage trigger remains off because it has no input on line 7. At the occurrence of "write" sample pulse the "accumulator *y* gate" pulse developed by the "on" condition of the carry/borrow trigger and the "off" condition of the storage trigger, causes the accumulator to change state or in other words to turn "on" at time *t*15. At time *t*15 of *y* time, the "off" condition of the accumulator trigger is "up" and applies a conditioning potential through line 26 to one leg of the "off" gate of carry/borrow trigger 24. Thus, at the presence of the "accumulator *y* gate" and the occurrence of the "write" sample pulse, the carry/borrow trigger is caused to turn "off" at time *t*15. Simultaneously, however, the "falling" output pulse of the carry/borrow trigger is regarded as being "up" and this is effective to produce an "accumulator *y* gate" from the exclusive OR circuit described and thus, the accumulator trigger is conditioned for changing states. The "write" sample pulse produced during this time completes the required conditions for the change of state and the accumulator trigger is thus, turned on as described above. In the fourth order then, the "on" condition of the accumulator trigger indicates a sum digit of one and the "off" condition of the carry/borrow trigger indicates a zero carry digit. Since no further pulses indicative of binary digits appear, this completes the addition. The accumulator trigger will turn off at the occurrence of the next "write" sample pulse and "off" condition of the storage trigger.

The conditions of the accumulator trigger during the respective ends of the order periods are thus indicative of the sum number resulting from the addition. Taken in inverse order, these digits are 1, 1, 0, 0, to give the binary number 1100 which, of course, is the correct answer to the addition of 111 to 101.

For an understanding of the manner in which the circuit 1 performs substraction, it is assumed that the binary number 1010 is a subtrahend to be subtracted from the minuend, 1101. Thus, in FIGURE 2 of the drawings, the pulses that appear at input line 7 are represented at 67, 68, 69, 70, and 71. Those appearing at *x* time of any order period represent the subtrahend digit of that order and those appearing at *y* time of any order period represent the minuend digit of that order. The absence of a pulse being indicative of binary zero.

The absence of a pulse at *x* time *t1* of the first order period indicates a binary zero in the lowest order of the subtrahend and thus, the storage trigger remains in the "off" condition. At *y* time *t4*, however, the pulse 67 indicates a binary "1" in the lowest order of the minuend and this pulse turns on the storage trigger since the "on" gate is conditioned by the potentials applied to lines 5 and 6. The "on" condition of the storage trigger is represented by the wave 72. The "on" condition of the storage trigger causes the accumulator trigger to be turned "on" at time *t5* in the manner described above when AND circuits 41 and 42 receive an exclusive OR input. The potential wave form 73 indicates the "on" condition of the accumulator trigger. AND circuit 51 is disabled by the absence of an ADD specification. AND circuit 50 is activated by the SUBTRACT specification, but inverter 49 transforms the "accumulator *y* gate" signal into one which is rejected by AND circuit 50. Carry/borrow trigger 24 thus can not be changed in state since no effective signal is passed through converter 55 to the AND input lines 90 and 92. Again, at "write" time *t6* with the occurrence of a 01 sample pulse, the storage trigger is turned "off." Thus, the conditions of the accumulator and carry/borrow triggers at the end of the first order period indicate the result of subtracting the first order subtrahend digit from the first order minuend digit. That is, the "on" condition of the accumulator trigger indicates a difference of 1 and the "off" condition of the carry/borrow trigger indicates that no borrow digit from the next higher order is developed. At "*x*" time *t7* of the second order period, the pulse 68 indicates a binary "1" digit in the second order of the subtrahend number and this pulse turns on the storage trigger. The accumulator at this time is already "on" and is unaffected by the turning on of the storage trigger. During "*y*" time *t9* of the second digit period, there is an absence of a pulse on line 7 and thus, the storage trigger remains "off." Referring to FIGURE 1 of the drawings, it is observed in these circumstances that since the storage trigger and the carry/borrow trigger are both "off," there is no "accumulator *y* gate" developed. At "*y*" time, the *y* input line is conditioned. Line 52 is conditioned since the inverter circuit 49 inverts the logical zero presented at "accumulator *y* gate," line 48. Also, line 75 at the input to circuit 50 is conditioned since the circuit is specified to perform subtraction. Accordingly, through the action of the inverter 49, the subtraction specification, and the "*y*" time signal, all inputs of AND circuit 50 are conditioned. This conditions one of the AND "on" gates of the carry/borrow trigger and since the accumulator is "on," the other leg of the AND gate of the carry/borrow trigger is also conditioned. At the next "write" sample pulse 65, at time *t10* then, the carry/borrow trigger is turned on. This is represented by the wave shown at 77. The condition of the accumulator and carry/borrow triggers at this stage again represent the difference and borrow conditions at the second order period. That is, the subtraction of binary "1" from binary "0" gives a difference of "1" and a borrow of "1" from the next higher order is required. At "*x*" time *t11* of the third digit, the sense amplifier output is zero since the third order subtrahend digit is zero. However, at time *t12* "write" sample pulse 78 occurs and the accumulator is turned "off" since the input to circuit 33 along line 3 is zero and therefore its output is a logical "1" to apply a logical "1" potential to the accumulator "off" gate on line 31 through converter 37 and AND circuit 38. The carry/borrow trigger remains "on" since no *y* time signal appears at AND circuit 50. The pulse 69 produced on line 7 at *y* time *t13* of the third order period turns "on" the storage trigger as shown at 79. The line 35 from AND circuit 33 is not conditioned because an *x* time pulse would be required. However, at time *t16* the next "write" sample pulse 66 and the concurrent "on" condition of the storage and carry/borrow triggers fails to produce an "accumulator *y* gate" potential on line 48. The accumulator is not affected by this logical "0" potential, but the logical "0" potential is inverted by inverter 49 and applied to the carry/borrow "on" and "off" gates. The accumulator output line 26 is at a logical "1" and thus, at the "write" sample pulse 66, the carry/borrow trigger is turned "off." At this stage, the accumulator and carry/borrow triggers represent the difference and borrow conditions of the subtraction at the third order of the binary digits. That is, the "off" condition of the accumulator indicates a zero difference and the "off" condition of the carry/brorrow trigger also indicates no borrow from a higher order digit.

In the fourth order period, the pulse 70 is presented at time *t17* on line 7 to the input to the storage trigger and turns the storage trigger "on." The accumulator trigger follows at time *t14* and turns "on" at the next "write" sample pulse 81. The wave 82 represents the "on" condition of the accumulator at this state. The storage trigger is turned "off" at time *t18* at the concurrence of "write" time and the 01 sample pulse 16'. At *y* time *t20* of this fourth order period, the line 7 receives pulse 71 indicative of binary "1" in the fourth order of the minuend and this again turns on the storage trigger. At this stage then the "accumulator *y* gate" develops a potential that is applied to both gates of the accumulator trigger and thus, at the next "write" sample pulse 84 at time *t15*, the accumulator trigger is turned off. At the end of this fourth order period, the storage trigger is turned "off" by the concurrence of the "write" time potential and the 01 sample pulse. Also, at this stage the condition of the triggers indicates the difference and borrow digits of the subtraction being performed. The accumulator and carry/borrow triggers are both "off" to indicate zero difference and borrow digits in this order. This then completes the subtraction since there are no higher order digits and no borrow from a higher order digit.

In a manner entirely similar to that hereinabove explained in detail, the action of the circuit 1 is performing an addition of any other pair of binary numbers or in performing the subtraction of any other binary number from another can be explained.

For a more complete description of the storage and carry/borrow triggers, reference is made to FIGURE 3 of the drawings showing a detailed schematic drawing of a trigger circuit suitable for operation as these triggers. In this circuit, a pair of transistors 84 and 85 have respective bases and collectors cross-coupled through the emitter follower transistors 86 and 87. A suitable direct potential source designated +V, is connected to the bases of transistors 84 and 85 through respective resistors 88 and 89 and this potential is also connected to the emitters through respective resistors 86a and 87a of the emitter follower transistors 86 and 87. Another source of potential provides a negative direct potential designated −V2, to the collectors of the transistors 86 and 87. In one state of equilibrium of this circuit, called the "off" state, the transistor 84 is conducting relatively heavily, emitter follower transistor 87 is conducting relatively heavily and transistors 85 and 86 are substantially cut-off. In the other state of equilibrium called the "on" state, transistors 84 and 87 are substantially cut-off and transistors 86 and 85 are conducting relatively heavily. For controlling the state of equilibrium of this trigger circuit, an "on" gate and an "off" gate are provided. The "on" gate includes resistors 90 and 91 connected between terminals 92 and 93, respectively, and the anode of a diode 94, the cathode of which is connected to the base of transistor 84. A capacitor 95 interconnects another terminal 96 and the anode of the diode 94 to provide for "alternating current" coupling. The "off" gate at the right side of this figure is entirely symmetrical and similar in construction to the described "on" gate.

With reference to FIGURE 1 of the drawing, the input lines 5 and 6 as applied to storage trigger 2 would be connected to the terminals 92 and 93 and the sense line 7 would be connected to the terminal 96. The output lines 3 and 4 correspond to the collector output terminals 97 and 98, respectively.

The details of the accumulator trigger are shown in FIGURE 4 of the drawings. In this figure, the transistors 99 and 100 have bases and collectors cross-coupled through emitter follower transistors 101 and 102. Positive direct potential derived from a source designated +V, is applied to the bases of the transistors 99 and 100 through respective pairs of serially connected resistors 103, 104, and 105, 106 and to the emitters of transistors 101 and 102 through respective resistors 107 and 108. A suitable source of negative direct potential designated, —V1, is applied to the collectors of transistors 99 and 100 through respective resistors 109 and 110 and this negative potential is connected directly to the collectors of the emitter follower transistors 101 and 102.

This trigger is also capable of assuming a pair of states of stable equilibrium. In one of these states, called the "off" state transistors 99 and 102 are in a state of heavy conduction and the transistors 101 and 100 are substantially cut-off. In the "on" state of the trigger, the transistors 99 and 102 are cut-off and the transistors 100 and 101 are in a state of heavy conduction.

For controlling the state of the circuit, gate circuits are provided for turning the trigger "on" and "off." The "on" gate includes resistors 123 and 125 connected between terminal 111 and the emitter of transistor 101, resistors 112, and 113 connected serially between terminal 114 and the emitter of transistor 101. Terminal 115 is connected to the base of transistor 99 through the serial connection of capacitor 117 and diode 118 and terminal 116 is connected to this base through the serial connection of capacitor 119 and diode 120. The junction of resistors 123 and 125 is connected to the junction of capacitor 117 and diode 118 and the junction of resistors 112 and 113 is connected to the junction of capacitor 119 and diode 120. For the present purposes, terminals 115 and 116 are interconnected and are conditioned by line 29 as shown in FIGURE 1. If the circuit is conditioned by the the application of ground potential to either of terminals 111 or 114, it is responsive to a ground potential pulse applied to terminals 115 and 116 to turn the trigger "on" if it is "off."

The "off" gate of the circuit, shown generally at 121, is similar to the "on" gate and is effective in a manner entirely similar to that described with respect to the "on" gate to turn the trigger "off" if it is "on."

The positive AND circuit 33 shown in FIGURE 1 is shown in detail in FIGURE 5. This circuit includes a transistor 122 having its base electrodes connected to a source of positive potential designated, +V through resistor 123. The collector of this transistor is connected to a source of negative potential designated, —V, through a resistor 124. Input terminals 125 and 126 of this circuit are connected through respective resistors 127 and 128 to the base of this transistor and the output of this circuit is taken from the collector of the transistor. The resistors of this circuit are proportioned with respect to each other and to the potentials, +V and, —V, so as to cut-off the transistor if relatively positive potentials are applied to both of the terminals 125 and 126 and to establish conduction in the transistor if either of the terminals has a relatively negative potential applied to it. Thus, the circuit may be described as a positive AND circuit since the circuit is responsive to the coincidence of relatively positive input potentials to produce a different output potential. It should be noted, however, that the output changes to a relatively negative value. Thus, more completely the circuit may be called a complementary positive AND circuit. It should be noted that the input potentials of this circuit vary from some value less than zero to zero potential, herein designated an S range and that the output potentials vary from ground or zero potential to a value less than zero, also designated S range. It should be observed that the inverter circuits 36 and 49 shown in FIGURE 1 of the drawings may be obtained simply by using only one of the input lines of the positive AND circuit of FIGURE 5.

AND circuit 43 shown in FIGURE 1 of the drawings may be of a construction shown in detail in FIGURE 6 of the drawings. In this figure, the transistor 130 has its base and collector connected to a source of negative potential designated, —V, through respective resistors 131 and 132 and the input terminals 133, 134, and 135 are connected to the base of this transistor through respective resistors 136, 137, and 138. The resistors and potential, —V of this circuit are so proportioned that with a relatively positive potential applied to any one of the three input terminals 133, 134, or 135, the transistor 130 is in a state of nonconduction whereby the output potential is substantially, —V, and if ground potential is connected to all three of these input terminals, the transistor is in a state of heavy conduction and the output terminal of this circuit is at substantially ground potential. It should also be noted that the input potentials of this circuit vary from a positive value to zero or ground. This is herein referred to as the R range. The output potentials vary from a negative value to ground and thus, are in the S range as hereinabove described. Accordingly, this circuit serves as an AND circuit, or with one input only, serves as a circuit to convert the potential range of the signal involved from the R to the S level.

AND circuits 41, 42, 50 and 51 in FIGURE 1 of the drawings may be derived from circuits as shown in detail in FIGURE 7 of the drawings. These circuits have input potentials in the S range and output potentials in the R range.

In FIGURE 7, a transistor 139 of the NPN type has its emitted grounded and its collector connected through a resistor 140 to a source of positive potential represented by the symbol, +V. The base of transistor 139 is positively biased by source, +V, which is connected through a resistor 141 to this base.

Input potentials are applied to the base from input terminals 142, 143 and 144, which are respectively connected to the transistor base through resistors 145, 146 and 147. The values of the respective resistors and potential, +V, are proportioned relative to each other to produce conduction in transistor 139 when all input potentials are +S and to cut off the transistor conduction when any input potential is —S. Since the output potential is complemented, that is, is relatively positive when all inputs are relatively negative and vice versa, it is called a complementary positive AND circuit.

The circuits of FIGURE 7 are combined as shown in FIGURE 8 to provide the DOT OR functions as represented at **41*a* and 50*a* and described hereinabove. Thus, the AND circuits having transistors 139*a* and 139*b* share a common load resistor 140*a*** and a common output terminal. In all other respects, these circuits are individually the same as shown in FIGURE 7.

As may readily be understood, the component circuits of the adder/subtracter 1 are so constructed to interconnect output of one unit to the input of the next unit so that both have the same range of potential variations. That is, an R output is connected to an R input and an S output is connected to an S input. This is designated on the logic blocks of the drawing by the appropriate letters near respective input and output lines.

While the invention has been particularly shown and described with reference to a preferred embodiment thereof, it will be understood by those skilled in the art that various changes in form and details may be made therein without departing from the spirit and scope of the invention.

What is claimed is:

1. A circuit for determining the difference between a pair of binary numbers when its input is respective digits represented by a series of alternately occurring electrical pulses comprising: a pair of bistable circuits each being capable of assuming two states of stable equilibrium designated "on" and "off" respectively; means for establishing an "on" state of equilibrium of the first of said bistable circuits in response to a signal representing binary one occurring in a predetermined order of the first of said numbers; means responsive to a signal representing binary one occurring in said predetermined order of the second of said numbers or to the "on" condition of the second of said bistable circuits but not to both, to cause the first of said bistable circuits to change state; and means to set said second bistable circuit to the state of said first bistable circuit when said first bistable circuit remains unchanged in state whereby the state of said first bistable circuit is indicative of the difference between the digits of a predetermined order of two binary numbers and the state of the second of said bistable circuits is indicative of the borrow digit resulting from the subtraction.

2. A circuit for performing addition and subtraction operations selectively on a pair of binary numbers each having its digits represented by electrical potentials in a temporal series of time intervals with the time intervals of corresponding orders of the numbers being nonconcurrent but next adjacent in time comprising: means for specifying the operation to be performed on said numbers; a pair of bistable circuits each being capable of assuming two states of stable equilibrium designated "on" and "off," respectively; means for establishing an "on" state of equilibrium of the first of said circuits in response to an electrical potential representing binary one occurring in a predetermined order of the first of said numbers; means responsive to an electrical potential representing binary one occurring in said predetermined order of the second of said numbers or to the "on" condition of the second of said bistable circuits but not to both, to cause the first of said bistable circuits to change its state; means to set the second bistable circuit to the previous state of said first bistable circuit when both an addition specification of said specifying means and a change of state of said first bistable circuit occur; and means to set the second bistable circuit to the state of the first bistable circuit when both a subtract specification of said specifying means occurs and said first bistable circuit remains unchanged in state whereby the state of the first bistable circuit after the presentation of the two digits of the same order of two binary numbers is indicative of the sum of such digits and the carry digit from the next lower order when addition is specified and to the difference resulting from the subtraction of the digit of the first number and a borrow order digit from the next lower order subtraction from the digit of the second number when subtraction is specified and the state of the second of said bistable circuits is indicative of the carry and borrow digit affecting the next higher arithmetic operation.

3. A circuit for selectively performing addition and subtraction operations on a pair of binary numbers each having its digits represented by electrical potentials in a temporal series of time intervals of corresponding orders of the number, the numbers being nonconcurrent but next adjacent in time comprising: means for specifying the operation to be performed on said numbers; a pair of bistable circuits each being capable of assuming two states of stable equilibrium designated "on" and "off," respectively; means for establishing an "on" state of equilibrium of the first of said circuits in response to an electrical potential representing binary one occurring in a predetermined order of the first of said numbers; means responsive to an addition specification of said specifying means and the inequality of the carry digit resulting from an addition performed in the next lower order of said number as represented by the condition of the second of said bistable circuits and the digit in said predetermined order of the second of said numbers to change the state of said first bistable circuit and to set the second bistable circuit to the previous state of the first bistable circuit; means responsive to a subtraction specification of said specifying means and the inequality of the borrow digit resulting from a subtraction performed in the next lower order of said number as represented by the condition of the second of said bistable circuits and the digit in said predetermined order of the second of said numbers to change the state of said first bistable circuit and to set said second bistable circuit to the state of said first bistable circuit in the absence of said inequality whereby the condition of said bistable circuits at the end of two intervals corresponding to digits of the same order of two binary numbers represent the sum and carry digits, respectively, resulting from an addition operation and the difference and borrow digits, respectively, resulting from a subtraction operation of said circuit under control of said specifying means.

4. A circuit for performing subtraction on a pair of binary numbers each having its digits represented by electrical potentials in a temporal series of time intervals of corresponding orders of the numbers, the numbers being nonconcurrent but next adjacent in time comprising:

- a pair of bistable circuits each being capable of assuming two states of equilibrium designated "on" and "off," respectively,
- means for establishing an "on" state of equilibrium of the first of said bistable circuits in response to an electrical potential representing binary one occurring in a predetermined order of the first of said numbers,
- means responsive to the inequality of the borrow digit resulting from a subtraction performed in the next lower order of said number as represented by the condition of the second of said bistable circuits and the digit in said predetermined order of the second of said numbers to change the state of said first bistable circuit,
- means responsive to the equality of the borrow digit resulting from a subtraction performed in the next lower order of said number as represented by the condition of the second of said bistable circuits and the digit in said predetermined order of the second of said numbers to set said second bistable circuit to the state of said first bistable circuit whereby the condition of said bistable circuits at the end of two intervals corresponding to digits of the same order of two binary numbers represents the difference and borrow digits, respectively, resulting from a subtraction operation of said circuit.

5. A circuit for performing subtraction upon a series of binary digits displaced in time representing two numbers comprising:

- a first bistable device capable of being switched,
- means to condition said first bistable device in response to those of said binary digits representing one of said two numbers to a status representative of the status of said digits of said one number,
- a second bistable device,
- means to obtain an exclusive OR logical indication from a comparison of said binary digits representing the other of said two numbers and the status of said second bistable device,
- means to switch said first bistable device in response to said exclusive OR logical indication,
- means to condition said second bistable device to a status representative of the status of said first bistable device when said first bistable device is not switched, and to retain said second bistable device in its status when said first bistable device is switched.

6. A circuit for performing addition when in an addition mode and subtraction when in a subtraction mode upon a series of binary digits displaced in time representing two numbers comprising:

means to condition said circuit to the addition mode and to the subtraction mode, a first bistable device capable of being switched, means to condition said first bistable device in response to those of said binary digits representing one of said two numbers to a status representative of the status of said digits of said one number, a second bistable device, means to obtain an exclusive OR logical indication from a comparison of said binary digits representing the other of said two numbers and the status of said second bistable device, means to switch said first bistable device in response to said exclusive OR logical indication, means effective when said circuit is conditioned to the addition mode to condition said second bistable device to a status representative of the status of said first bistable device before said first bistable device was switched when said first bistable device is switched, and to retain said second bistable device in its status when said first bistable device is not switched, means effective when said circuit is conditioned to the subtraction mode to condition said second bistable device to a status representative of the status of said first bistable device when said first bistable device is not switched, and to retain said second bistable device in its status when said first bistable device is switched.

7. A circuit for performing addition when in an addition mode and subtraction when in a subtraction mode upon a series of binary digits displaced in time representing two numbers comprising:

a first bistable device capable of being switched, means to condition said first bistable device in response to those of said binary digits representing one of said two numbers to a status representative of the status of said digits of said one number, a second bistable device, means to obtain an exclusive OR logical indication from a comparison of said binary digits representing the other of said two numbers and the status of said second bistable device, means to switch said first bistable device in response to said exclusive OR logical indication, means normally deactivated connecting said first bistable device to said second bistable device to condition said second bistable device to the status of said first bistable device, means responsive to one condition, said one condition being representative of addition, to cause said exclusive OR logical indication to activate said means connecting said first bistable device and said second bistable device at a time during which the status of said first bistable device before it is switched is conditioned into said second bistabled device, means responsive to a second condition, said second condition being representative of subtraction, to cause the absence of said exclusive OR logical indication to activate said means connecting said first bistable device and said second bistable device, means to selectively activate said means representative of addition and said means representive of subtraction.

8. An arithmetic circuit for performing addition when in an addition mode and subtraction when in a subtraction mode upon an alternating series of two binary digits, digits of one number occurring at time intervals denominated as $x$ time and digits of the second number occurring at time intervals denominated as $y$ time comprising:

a first bistable circuit capable of being changed in state by an effective signal at one input and capable of being conditioned to one of its two states by an effective signal at a second input and being conditioned to its other state by an effective signal at a third input, means adapted to be effective at $x$ time to receive said alternating series of binary digits and to apply an effective signal to said second input of said first bistable circuit for one state of said binary digits and to apply an effective signal to said third input of said first bistable circuit for the other state of said binary digits, a second bistable circuit capable of being conditioned to one of its two states by an effective signal at a first input and to its other state by an effective signal at a second input, signals at said inputs being ineffective until said second bistable circuit is activated by a first and a second concurrent, partially activating signals, an exclusive OR circuit adapted to receive said alternating series of binary digits at $y$ time and connected to said second bistable circuit to produce an ineffective signal when said binary digits and said second bistable circuit represent the same binary numerical value and an effective signal when said binary digits and said second bistable circuit represent different binary numerical values, means adapted to be effective at $y$ time to connect said effective signal of said exclusive OR circuit to said one input of said first bistable circuit, means to connect said first bistable circuit to both said first input and said second input of said second bistable circuit in a manner such that said first bistable circuit tends to condition said second bistable circuit to a status representative of the status of said first bistable circuit, means adapted to be effective at $y$ time and when said arithmetic circuit is in the addition mode and to said effective signal of said exclusive OR circuit to produce said first partially activating signal to said second bistable circuit, means adapted to be effective at $y$ time and when said arithmetic circuit is in the subtraction mode and to said ineffective signal of said exclusive OR circuit to produce said first partially activating signal to said second bistable circuit, means adapted to be effective for a time consisting of at least part of the time period in $y$ time before said first bistable circuit is completely switched to apply said second partially activating signal to said second bistable circuit, means to selectively condition said arithmetic circuit to the addition mode and to the subtraction mode.

References Cited by the Examiner

UNITED STATES PATENTS

| | | | |
|---|---|---|---|
| 2,952,407 | 9/60 | Weiss et al. | 255—175 |
| 3,042,304 | 7/62 | Hall et al. | 235—175 |

MALCOLM A. MORRISON, *Primary Examiner.*